United States Patent [19]

Dorsett

[11] 4,094,079
[45] June 13, 1978

[54] SINGLE MEDIUM AUDIO-VISUAL TEACHING MACHINE

[75] Inventor: Loyd G. Dorsett, Norman, Okla.

[73] Assignee: Dorsett Educational Systems, Inc., Norman, Okla.

[21] Appl. No.: 784,737

[22] Filed: Apr. 5, 1977

[51] Int. Cl.² ............................................. G09B 5/06
[52] U.S. Cl. ........................................ 35/8 A; 35/9 A
[58] Field of Search .............. 35/8 A, 8 R, 9 R, 9 A, 35/9 B, 9 E, 35 C, 48 R; 340/324 A, 324 AD; 360/33, 72; 364/200, 900

[56] References Cited

U.S. PATENT DOCUMENTS

| | | | |
|---|---|---|---|
| 3,376,657 | 4/1968 | Dorsett | 35/9 A |
| 3,405,457 | 10/1968 | Bitzer | 35/9 R |
| 3,481,052 | 12/1969 | Dorsett | 353/77 |
| 3,555,520 | 1/1971 | Helbig et al. | 364/900 |
| 3,579,197 | 3/1971 | Stapleford | 364/200 |
| 3,623,157 | 11/1971 | Stapleford | 35/9 A X |
| 3,987,484 | 10/1976 | Bosche et al. | 360/72 X |
| 3,999,307 | 12/1976 | Tsuda et al. | 35/9 A |
| 4,032,897 | 6/1977 | Pooley | 364/900 |
| 4,040,088 | 8/1977 | Hannan | 340/324 AD |

Primary Examiner—Richard C. Pinkham
Assistant Examiner—Vance Y. Hum
Attorney, Agent, or Firm—Dunlap, Codding & McCarthy

[57] ABSTRACT

An audio-visual teaching machine including a source record playback unit providing a composite source output signal corresponding to a source record having audio, video control and source control portions; a video control unit for storing the video control portion of the composite source output signal and providing a composite video signal corresponding to the stored video control portion for application to a video display unit; a source control unit responsive to the source control portion of the composite source output signal for controlling the operation of the video control unit and the source record playback unit; and circuitry for applying the audio portion of the composite source output signal to an audio output unit.

8 Claims, 3 Drawing Figures

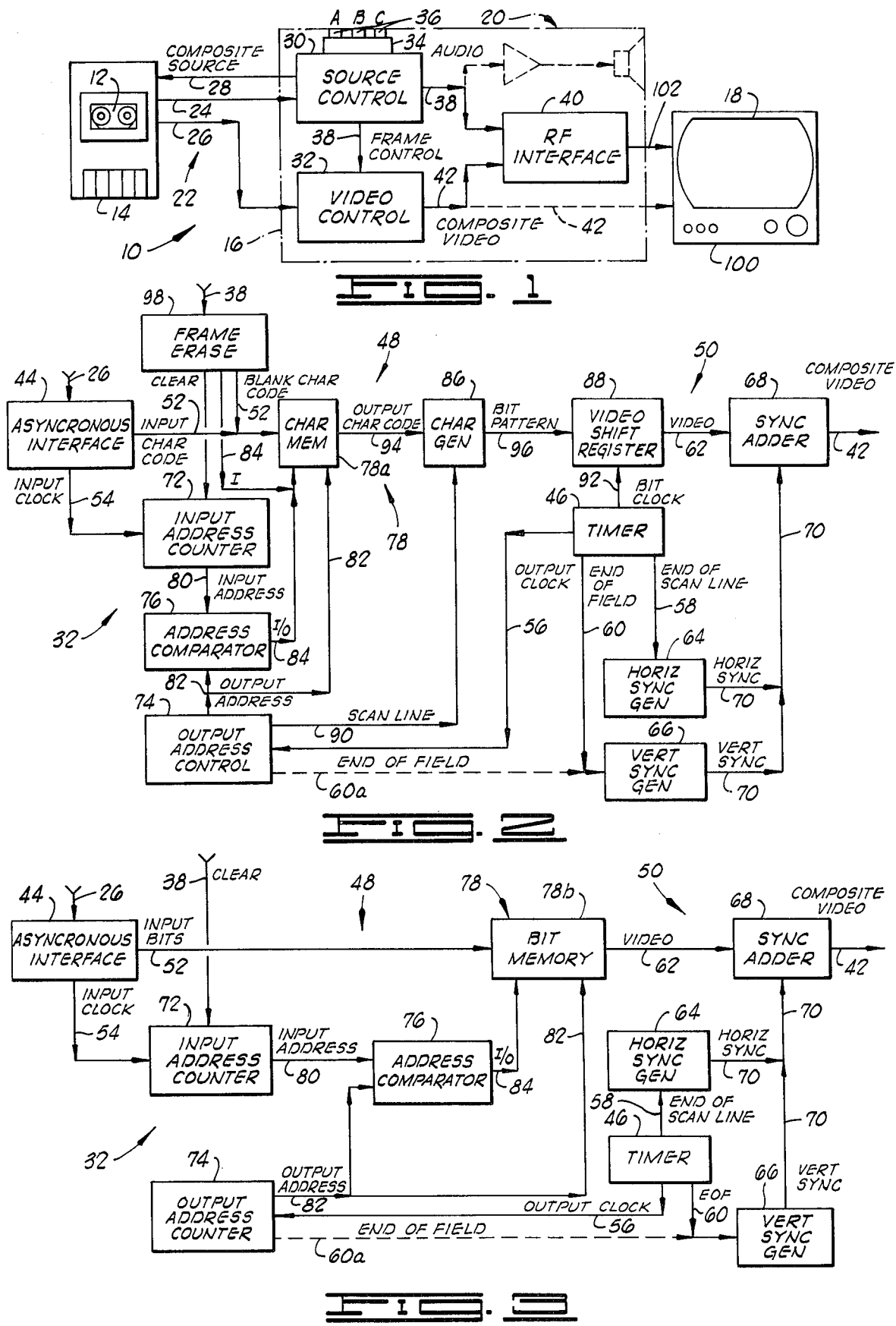

SINGLE MEDIUM AUDIO-VISUAL TEACHING MACHINE

SUMMARY OF THE INVENTION

1. Field of the Invention

This invention relates generally to improvements in audio-visual teaching machines and, more particularly, but not by way of limitation, to an audio-visual teaching machine for use with a single-medium source record comprising an audio portion, a video control portion and a source control portion.

2. Description of the Prior Art

The prior art of information presentation devices in general includes such diverse types as simple filmstrip projectors and sophisticated computer aided instruction systems utilizing inter-active terminals. In the more limited area of combined audio and visual presentation devices, the types range from sophisticated video tape recording and playback systems and high quality film projectors with audio components to dual-medium devices employing filmstrips or the like in conjunction with low speed audio recordings on magnetic tape or plastic records. Although all of such devices are generally classifiable as "teaching machines," in that they perform an information presentation task, a more accurate use of the term "teaching machine" would be limited to those devices employing some type of response discrimination wherein the viewer is required to provide positive responses to periodic inquiries by the device. Thus, although computer aided instruction systems may be generically termed "teaching machines," they are generally limited to visual modes of communication and thus fall outside the scope of the present invention. True audio-visual teaching machines employing a response discrimination concept are taught in the Applicant's U.S. Pat. Nos. 3,376,657 and 3,481,052, although such machines require two input mediums in order to simultaneously provide audio and visual information to the viewer.

SUMMARY OF THE INVENTION

An audio-visual teaching machine including a source record playback unit providing a composite source output signal corresponding to a source record having audio, video control and source control portions, a video control unit for storing the video control portion of the composite source output signal and providing a composite video signal corresponding to the stored video control portion for application to a video display unit; a source control unit responsive to the source control portion of the composite source output signal for controlling the operation of the video control unit and preferably the source record playback unit; and means for applying the audio portion of the composite source output signal to an audio output unit.

It is a primary object of the present invention to provide an audio-visual teaching machine for use with a single-medium source record having an audio-portion, a video control portion and a source control portion.

Another object of the present invention is to provide a single-medium audio-visual teaching machine having a response discrimination portion for controlling the operation of the teaching machine in accordance with responses provided by a viewer.

Yet another object of the present invention is to provide a single-medium audio-visual teachine machine for use with a video display unit wherein the video portion is stored in a memory circuit prior to application to the video display unit as a composite video signal.

Still another object of the present invention is to provide a simple, low-cost, yet reliable, single-medium audio-visual teaching machine employing a relatively low speed source record playback unit and a conventional TV-type video display unit.

Other objects and advantages of the present invention will be evident from the following detailed description when read in conjunction with the accompanying drawings which illustrate the preferred embodiment of the present invention.

BRIEF DESCRIPTION OF THE DRAWINGS

FIG. 1 illustrates in diagrammatical form a single-medium audio-visual teaching machine constructed in accordance with the preferred embodiment of the present invention.

FIG. 2 illustrates in schematic form a video control unit suitable for use in the single-medium audio-visual teaching machine shown in FIG. 1.

FIG. 3 illustrates in schematic form an alternate video control unit for use in the single-medium audio-visual teaching machine shown in FIG. 1.

DESCRIPTION OF THE PREFERRED EMBODIMENT

Referring to the drawings in general and to FIG. 1 in particular, shown therein and referred to by the general reference number 10 is a single-medium audio-visual teaching machine constructed in accordance with the preferred embodiment of the present invention. The audio-visual teaching machine 10 is constructed for use with a source record 12 comprising an audio portion, a video control portion having video display pulses entrained therein, and a source control portion having one or more control pulses entrained therein in one of a predetermined number of response states. More particularly, the audio-visual teaching machine 10 includes a source record playback unit 14, a control circuit 16, and a video display unit 18 for providing a visual output signal in response to a composite video signal applied thereto. The audio-visual teaching machine 10 also includes an audio output unit for providing an audible output signal in response to an audio signal applied thereto. As will be clear to those skilled in the art, the audio output unit may be physically integrated with the source record playback unit 14, the video display unit 18, or the control circuit 16, for example, as shown in phantom at 20.

The source record playback unit 14 includes a playback portion constructed to receive the source record 12 and provide a composite source output signal, via a general signal path 22, having an audio portion corresponding to the audio portion of the source record 12, a video control portion corresponding to the video control portion of the source record 12, and a source control portion corresponding to the source control portion of the source record 12. Although the source record 12 and the source record playback unit 14 have been shown by way of example as being of the magnetic tape type, it will be clear to those skilled in the art that the source record 12 and the source record playback unit 14 could conveniently be of the phonograph record type or other similar medium.

Due to the limited output band width of most source record playback units 12 of the magnetic tape or phonograph record types, it is envisioned that the composite source output signal will be provided in a conventional "stereo" output mode, with the source control portion being impressed on the audio portion at frequencies somewhat below or above audible frequencies for output on a first channel via a signal path 24, while the video control portion is output on a second channel via a signal path 26. While such a mode of operation has been determined to be preferable for reasons of economy, it is recognized that such techniques as frequency shift key (FSK) encoding may be beneficially employed to enable the audio-visual teaching machine 10 to operate satisfactorily with a high-quality source record playback unit 14 providing only a single or "mono" output signal.

In order to obtain the significant advantages inherent in the response-discrimination mode of operation of the audio-visual teaching machine 10, the source record playback unit 14 preferably includes a pause control portion for interrupting the operation of the playback portion thereof in response to a pause signal applied thereto via a signal path 28. However, for source record playback units 14 lacking such an electronically-actuatable pause control portion, it is proposed to interpose a power relay (not shown) in the power line of the source record playback unit 14 and actuate the relay via the pause control signal on the signal path 28. Thus, the audio-visual teaching machine 10 is able to suspend operation of the source record playback unit 14 during the time required for a viewer to respond in an acceptable manner.

In the preferred embodiment, the control circuit 16 is comprised primarily of a source control unit 30 and a video control unit 32. The source control unit 30 is connected to the source record playback unit 14 via the portion of the general signal path 22 referred to above as the signal path 24. The source control unit 30 includes a response control portion 34 having a plurality of actuatable response input elements 36 (referred to generally in FIG. 1 by the letters A, B, and C), each response input element 36 providing a response input signal in a different, predetermined one of the response states in response to the actuation thereof by the user of the audio-visual teaching machine 10. The source control unit 30 is constructed to receive the source control portion of the composite source output signal via the signal path 24, and initiate production of the pause control signal for application to the pause control portion of the source record playback unit 14 via the signal path 28, in response to detecting a control pulse entrained in the source control portion of the composite source output signal having one of a selected plurality of the response states. Thus, for example, the source control unit 30 will place the source record playback unit 14 in a pause condition in response to receiving a control pulse having a response state indicating that a response from the viewer is required, say by actuation of the A response input element 36.

Having initiated production of the pause control signal, the source control unit 30 is constructed to be responsive to the response control portion 34 by receiving each of the response input signals provided thereby, comparing the response state of the detected control pulse and the response state of the received response input signal, and terminating production of the pause signal when the response state of the detected control pulse is equal to the response state of the received response input signal. Thus, the source control unit 30 will maintain the source record playback unit 14 in a pause condition in the event the viewer depresses either the B or C response input elements 36 but will restore the source record playback unit 14 to the operating condition upon the actuation by the viewer of the A response input element 36. In this manner, the audiovisual teaching machine 10 provides a positive reinforcement to the viewer upon the actuation of an appropriate one of the response input elements 36.

For reasons which will be made more apparent below, the source control unit 30 may also be constructed to provide a frame control signal having a frame control pulse entrained therein for application to the video control unit 32 via a signal path 38, when the response state of the received response input signal is equal to the response state of the detected control pulse, indicating that the viewer has responded in a correct manner. In addition, the source control unit 30 may be constructed to provide the frame control signal when the response state of the detected control pulse is equal to a selected one of the response states, such a response state being conveniently referred to as a frame erase state.

In the preferred embodiment, the source control unit 30 also includes means for receiving the audio portion of the composite source output signal via the signal path 24 and applying the received audio portion via a signal path 38 to the audio output unit 20 as the audio signal. When it is desired to employ an audio output unit forming a physical portion of the video display unit 18, the source control unit 30 may as easily apply the received audio portion to the audio output portion of the video display unit 18 via the signal path 38 and a conventional RF interface circuit 40 of well known construction. In the event it is desired to employ an audio output portion of the source record playback unit 14, the source control unit 30 may be constructed to return the audio portion of the composite source output signal to the source record playback unit 14 in a conventional manner or the source record playback unit 14 may be provided with conventional circuitry of well known construction to enable it to provide an audible output signal corresponding to the audio portion while simultaneously providing the composite source output signal via the general signal path 22.

Circuitry suitable for accomplishing each of the functions of the source control unit 30 described above, is schematically illustrated and described in detail in the Applicant's U.S. Pat. Nos. 3,376,657 and 3,481,052, as well as an abandoned, related patent application Ser. No. 700,112, filed Jan. 24, 1968, and entitled "Method and Apparatus for Response Discrimination." In view of the very detailed teachings of these patents and the now-abandoned related patent application, it is believed that no further reference to the detailed construction of the source control unit 30 is required herein. In addition, circuits conforming to the teachings of these patents and the related application may be obtained commercially by writing Dorsett Educational Systems, Inc., Box 1226, Norman, Okla. 73069.

The video control unit 32 is connected to the source record playback unit 14 via the signal path 26 and to the video display unit 18 via a signal path 42. The video control unit 32 is contructed to receive the video control portion of the composite source output signal via the signal path 26, store the video control portion, and provide a composite video signal corresponding to the stored video control portion for application to the video display unit 18 via the signal path 42. More particularly, as can be seen in FIGS. 2 and 3, the video control unit 32 comprises an asynchronous interface circuit 44, a timer circuit 46, a memory control circuit 48, and a video processing circuit 50.

The asynchronous interface circuit 44 is connected to the source record playback unit 14 via the signal path 26. The asynchronous interface circuit 44 is constructed to receive the video control portion of the composite source output signal via the signal path 26, detect the video display pulses entrained in the received video control portion, and provide an input data signal via a general signal path 52 having input data pulses entrained therein corresponding to the detected video display pulses. In addition, the asychronous interface circuit 44 provides an input clock signal via a signal path 54 having an input clock pulse entrained therein in response to detecting a predetermined number of the video display pulses. As will be clear to those skilled in the art, the asynchronous interface circuit 44 operates to receive the video display pulses in an asynchronous mode, that is as they arrive from the source record playback unit 14 and temporarily retain the video display pulses until the memory control circuit 48 is ready to accept the data in a synchronous mode. Such asynchronous-to-asynchronous receivers are well known in the art, and are commercially available from numerous sources such as the Motorola Company under the part number 6850. In view of the well known operating characteristics and commercial availability of such asynchronous interface circuits, no further reference to the internal components thereof will be made herein.

the timer circuit 46 is constructed to provide an ouput clock signal via a signal path 56 having output clock pulses entrained therein at a predetermined output clock rate, an end-of-scan-line signal via a signal path 58 having end-of-scan-line pulses entrained therein at a predetermined end-of-scan-line rate, and an end-of-field signal via a signal path 60 having end-of-field pulses entrained therein at a predetermined end-of-field rate. The timer circuit 46 will normally include an astable multivibrator, preferably employing a crystal control or a phase-locked loop, providing an output pulse rate at a convenient frequency on the order of 1 MHz. The output from the multivibrator may then be divided or multiplied using conventional techniques to provide pulse rates of the desired frequencies. For example, if a TV-type video display unit 12 is employed, an end-of-scan-line rate on the order of 15,750 Hz and an end-of-field rate on the order of 60 Hz would be appropriate. On the other hand, it will be clear to those skilled in the art, that the output clock rate will be generally dependent upon the type and performance criteria of the memory control circuit 48 selected for use. Since such considerations will be readily evident to those skilled in the art, no further explanation will be devoted herein toward the detailed construction and operating characteristics of the timer circuit 46.

The memory control circuit 48 is connected to the asynchronous interface circuit 44 via the signal paths 52 and 54, and to the timer circuit 46 via the signal path 56. The memory control circuit 48 is constructed to receive the input data signal via the signal path 52, the input clock signal via the signal path 54, and the output clock signal via the signal path 56. In response to receiving each input clock pulse entrained in the input clock signal, the memory control circuit 48 will store each input data pulse entrained in the received input data signal at a predetermined storage location. Thereafter, in response to each output clock pulse entrained in the output clock signal, the memory control circuit 48 will provide a video output signal via a signal path 62 having one or more video data pulses entrained therein corresponding to the input data pulse stored at a predetermined storage location.

The video processing circuit 50 is connected to the memory control circuit 48 via the signal path 62, to the timer circuit 46 via the signal paths 58 and 60, and to the video display unit 18 via the signal path 42. The video processing circuit 50 is constructed to receive the video output signals via the signal path 62 and add horizontal and vertical sync pulses to the received video output signal for application to the video display unit 18 via the signal path 42 as the composite video signal. More particularly, the video processing circuit 50 includes a horizontal sync generator 64, a vertical sync generator 66, and a sync adder 68. The horizontal sync generator 64 is connected to the timer circuit 46 via the signal path 58, and is constructed in a conventional manner to provide a horizontal sync pulse via a signal path 70 in response to receiving each end-of-scan-line pulse entrained in the end-of-scan-line signal. The vertical sync generator 66 is connected to the timer circuit 46 via the signal path 60, and is constructed in a conventional manner to produce a vertical sync pulse via the signal path 70 in response to receiving each end-of-field pulse entrained in the end-of-field signal. The sync adder 68 is connected to the memory control circuit 48 via the signal path 62, as well as to the horizontal and vertical sync generators 64 and 66, respectively, via the signal path 70, and is constructed in a conventional manner to add the horizontal and vertical sync pulses to the received video output signal for application to the video display unit 18 the signal path 42 as the composite video signal. Since the construction and operation of the horizontal and vertical sync generators 64 and 66, respectively, as well as the sync adder 68 are well known in the art, no further explanation will be included herein as to the detailed construction and operation thereof.

In the preferred embodiment, the memory control circuit 48 is comprised of an input address counter circuit 72, an output address counter circuit 74, an input-/output control circuit 76, and a memory circuit 78. The input address counter circuit 72 is connected to the asynchronous interface circuit 44 via the signal path 54, and, in response to receiving each input clock pulse entrained in the input clock signal, increments an input address count maintained internally therein and provides an input address signal via a signal path 80 corresponding to the input address count. If desired, the input address count may be periodically reset to an initial input address value in response to receiving a predetermined number of the input clock pulses. As will be clear to those skilled in the art, the input address counter circuit 72 may be easily constructed using commercially available binary counters such as those manufactured and sold by National Semiconductor Corporation under the part number 74193. In view of the well known structure and operating characteristics of such devices, as well as the general commercial availability thereof, no further explanation will be devoted herein towards the details of construction and operation of the input address counter circuit 72.

The output address counter circuit 74 is connected to the timer circuit 46 via the signal path 56, and, in response to receiving each output clock pulse entrained in the output clock signal, increments an output address count maintained internally therein and provides an output address signal via a signal path 82 corresponding to the output address count. Normally, the output address count will be periodically reset to an initial output address value in response to receiving a predetermined number of the output clock pulses. As will be clear to those skilled in the art, the output address counter circuit 74 is essentially a binary counter similar to construction and operation to the input address counter circuit 72, described above, except that the output address counter circuit 74 cycles continuously in response to the output clock signal while the input address counter circuit 72 cycles in response to the asynchronous arrival of video data pulses from the source record output unit 14. In view of this continuous operation characteristic, it will readily occur to those skilled in the art that an appropriate portion of the output address counter circuit 74 may be employed in a dual mode to provide the end-of-field signal as by the signal path 60a (shown in phantom), thereby potentially simplifying somewhat the structure of the timer circuit 46.

The input/output control circuit 76 is connected to the input address counter circuit 72 via the signal path 80, and to the output address counter circuit 74 via the signal path 82. The input/output control circuit 76 is constructed to receive the input and the output address signals via the signal paths 80 and 82, respectively, and compare the received input and output address signals. The input/output control circuit 76 will then provide an I/O control signal in an input state via a signal path 84 when the received input and output address signals are equal, but will provide the I/O control signal in an output state via the signal path 84 when the received input and output address signals are not equal. As will be clear to those skilled in the art, the input/output control circuit 76 is essentially a binary comparator which may be easily constructed using commercially available components, such as those available from the National Semiconductor Corporation as part number 7485.

The memory circuit 78 is connected to the asynchronous interface circuit 44 via the signal path 52, to the output address counter circuit 74 via the signal path 82, and to the input/output control circuit 76 via the signal path 84. The memory circuit 78 is constructed to receive the input data signal via the signal path 52, the output address signal via the signal path 82 and the I/O control signal via the signal path 84, and store each input data pulse entrained in the received input data signal at a predetermined storage location corresponding to the received output address signal, in response to simultaneously receiving the I/O control signal in the input state. On the other hand, the memory circuit 78 will provide a video output signal via the signal path 62 having one or more video data pulses entrained therein corresponding to the input data pulse stored at the received storage location corresponding to the received output address signal, in response to simultaneously receiving the I/O control signal in the output state. As will be clear to those skilled in the art, the memory circuit 78 is comprised primarily of a random access memory (RAM) of conventional construction such as those available from National Semiconductor Corporation.

Depending upon the characteristics of the video data pulses comprising the video control portion of the source record, the memory circuit 78 may include additional circuitry. Thus, for example, the memory circuit 78 shown in FIG. 2 will be appropriate when the video control portion consists of a series of characteristics encoded in any one of a number of standard coding schemes such as ASCII. Such a configuration will tend to minimize the size of the character memory circuit 78a required, but will require the inclusion of a character generator 86 and a video shift register 88 to provide for the translation of the input character codes to a corresponding video output signal. On the other hand, the video control portion may consist of a series of suitably encoded data pulses (e.g. "zeros" and "ones"), in which case the memory circuit 78 shown in FIG. 3 would be appropriate. In this configuration, the memory circuit 78 will consist simply of a relatively high-speed RAM memory circuit 78b capable of storing input data bits as they arrive from the source record playback unit 12 via the asynchronous interface circuit 44, while outputting the stored data bits at a sufficiently high rate to directly constitute the video output signal.

Considering the embodiment shown in FIG. 2 and assuming that the video display comprising the video control portion of the source record are grouped in sets of predetermined numbers (such as 6 "bits" for ASCII coding), then the asynchronous interface circuit 44 should be constructed so as to simultaneously provide each of the predetermined number of video display pulses for application to the character memory circuit 78a as individual input character codes. In addition, the output address counter circuit 74 should be constructed to maintain and appropriately increment a scan-line count in response to incrementing the output address count a predetermined number of times, and to provide a scan-like signal corresponding to the scan-line count for application to the character generator 86 via a signal path 90, the scan-line count being periodically reset to a predetermined scan-line starting value in response to incrementing the scan-line count a predetermined number of times. Further, the timer circuit 46 should also provide a bit clock signal via a signal path 92 having a bit clock pulses entrained therein at a predetermined bit clock rate.

As shown in FIG. 2, the character memory circuit 78a is connected to the asynchronous interface circuit 44 via the signal path 52, to the output address counter circuit 74 via the signal path 82, and to the input/output control circuit 76 via the signal path 84. The character memory circuit 78a is constructed to receive the input data signal via the signal path 52, the output address signal via the signal path 82 and the I/O control signal via the signal path 84, and to store each input character code consisting of the predetermined number of input data pulses entrained in the received input data signal at a predetermined storage location corresponding to the received output address signal, in response to simultaneously receiving the I/O control signal in the input state. On the other hand, the character memory circuit 78a will provide an output character code signal via a signal path 94 having an output character code entrained therein corresponding to the input character code stored at the predetermined storage location corresponding to the received output address signal, in response to simultaneously receiving the I/O control signal in the output state. As discussed above, the character memory circuit 78a may be easily constructed using such commercially available components as the NMOS 2102 IC available from National Semiconductor Corp.

The character generator 86 is connected to the character memory circuit 78a via the signal path 94, and to the output address counter circuit 74 via the signal path 90. The character generator 86 is constructed to receive the output character code signal via the signal path 94 and the scan-line signal via the signal path 90, and to generate a character bit pattern corresponding to the output character code entrained in the received output character signal, each character bit pattern being comprised of a predetermined number of scan-line bit patterns. Thereafter, the character generator 86 will provide a bit pattern signal via a signal path 96 having bit pattern pulses entrained therein corresponding to the scan-line bit pattern portion of the output character code corresponding to the received scan-line signal. For example, the character generator 86 may generate a unique 5×7 matrix of data bits for each unique character code, and output one of the 7 rows of 5 data bits as selected via the scan-line signal at the bit clock rate. Since circuits suitable for use as the character generator 86 are well known in the art and are commercially available from such companies as the National Semiconductor Corporation under the part number 5230, no further explanation will be devoted herein to the details of construction and operation thereof.

The video shift register 88 is connected to the character generator 86 via the signal path 96, to the timer circuit 46 via the signal path 92, and to the video processing circuit 50 via the signal path 62. The video shift register 88 is constructed to receive the bit pattern signal via the signal path 96 and the bit clock signal via the signal path 92, and provide a consecutive one of the bit pattern pulses entrained in the received bit pattern signal for application to the video processing circuit as the video output signal, in response to each bit clock pulse entrained in the received bit clock signal. As will be clear to those skilled in the art, the video shift register 88 is essentially a parallel-in/serial-out shift register of a commercially available type, such as that available from the National Semiconductor Corporation under the part number 7495. Since such circuits are well known in the art and are generally commercially available, no further explanation will be devoted herein to the details of their construction and operation.

Considering the embodiment shown in FIG. 3 and assuming that each of the video data pulses comprising the video control portion of the source record represents a complete "bit" of information (e.g. a "white" or a "black" dot at a precise location on the video display unit 18), then the asynchronous interface circuit 44 will cooperate with the input and output address counter circuits 72 and 74, respectively, and the input/output control circuit 76, to "clock" each "bit" into, and out of, the memory circuit 78b at appropriate rates. While such a configuration is considerably simpler to construct from commerically available IC's and offers greater flexibility in the types of visual displays, current pricing levels renders the circuit of FIG. 3 more expensive than the circuit of FIG. 2. However, the advent of memory devices of the magnetic-bubble, charge-coupled and ion-film types promises to dramatically lower the cost per bit of storage and make the configuration of FIG. 3 more cost effective.

Assuming that the source control unit 30 has been constructed as described above to provide the frame control signal for application to the video control unit 32 via the signal path 38, the input address counter circuit 72 should be connected to the source control unit 30 via the signal path 38, and constructed to receive the frame control signal via the signal path 38 and reset the input address count to the initial input address value in response to receiving the frame control pulse entrained in the frame control signal. As a more sophisticated alternative, the video control unit 32 may include a frame erase circuit 98 interposed in the signal path 38 between the source control unit 30 the input address counter circuit 72, with the frame erase circuit 98 also being connected to the memory circuit 78 via the signal path 52. The frame erase circuit 98 should preferably be constructed to receive the frame control signal provided by the source control unit 30 via the signal path 38, and produce a clear signal having a clear pulse entrained therein for application to the input address counter circuit 72 via the signal path 38 in place of the frame control signal. In addition, the frame erase circuit 98 should produce an I/O control signal in the input state for application to the memory circuit 78 via the signal path 84 in place of the I/O control signal normally produced by the input/output control circuit 76. Simultaneously with the production of the I/O control signal in the input state, the frame erase circuit 98 should produce a blank data signal having a predetermined number of blank data pulses entrained therein corresponding to a predetermined type of input data pulse for application to the memory circuit 78 via the signal path 52 in place of the input data signal normally provided by the asynchronous interface circuit 44. As will be clear to those skilled in the art, the frame erase circuit 98 effectively "clears" the memory circuit 78 by forcing the memory circuit 78 into an input state while simultaneously imposing blank data pulses on the input signal path 52 thereto. Since the construction and operation of the frame erase circuit 98 will be clear to those skilled in the art, no further explanation will be devoted herein to the detailed construction and operation thereof.

As indicated above, the audio output unit and the video display unit 18 may comprise portions of a conventional television receiver 100, which will also normally include an RF receiver portion (not shown). When the television receiver 100 is provided with appropriate direct input connections which bypass the conventional RF input stages thereof, the composite video signal provided by the video control unit 32 may be applied directly thereto via the signal path 42 (as shown in phantom). In the alternative, the RF interface circuit 40 may be interposed in the signal path 42 generally between the video control unit 32 and the video display unit 18 portion of the television receiver 100. As described above, the RF interface circuit 40 may also be interposed in the signal path 38 between the source control unit 30 and the audio output unit portion of the television receiver 100. The RF interface circuit 40 will be constructed in a conventional manner to receive the composite video signal via the signal path 42 and the audio signal via the signal path 38, and modulate the received composite video and audio signals onto an RF carrier having a predetermined frequency, for application to the RF receiver portion of the television receiver 100 via a signal path 102. Since CLASS-1 tv devices suitable for use as the RF interface circuit 40 are well known in the art, no further explanation will be devoted herein to the detailed construction and operation thereof.

A very detailed and informative discussion of the construction and operating characteristics of each of the components described herein as comprising the video control unit 32, as well as the RF interface circuit 40, is contained in the *TV Typewriter Cookbook* by Don Lancaster, published by Howard W. Sams and Company., Inc., of Indianapolis, Indiana. This reference also includes numerous additional sources of valuable information pertaining to the construction and operation of such circuits.

Having thus described a simple and economical, yet highly effective, audio-visual teaching machine 10 for use with a single-medium source record having an audio portion, a video control portion and a source control portion, there remains only to recognize that various changes may be made in the construction and arrangement of the parts or elements of the preferred embodiments described herein without departing from the spirit and the scope of the following claims.

What is claimed is:

1. In an audio-visual teaching machine for use with a source record comprising an audio portion, a video control portion having video display pulses entrained therein, and a source control portion having a control pulse entrained therein in one of a predetermined number of response states, the teaching machine including:
    a source record playback unit including a playback portion for receiving the source record, providing a composite source output signal having an audio portion corresponding to the audio portion of the source record, a video control portion corresponding to the video control portion of the source record, and a source control portion corresponding to the source control portion of the source record; and a pause control portion for interrupting the operation of the playback portion thereof in response to a pause signal applied thereto;
    an audio output unit for providing an audible output signal in response to an audio signal applied thereto; and,
    a video display unit for providing a visual output signal in response to a composite video signal applied thereto;

the improvement comprising:
    a source control unit means connected to the source record playback unit, the source control unit means including a response control portion having a plurality of actuatable response input elements, each response input element providing a response input signal in a predetermined one of the response states in response to the actuation thereof, the source control unit means for receiving the source control portion of the composite source output signal, detecting the control pulse entrained in the source control portion, initiating production of the pause control signal for application to the pause control portion of the source record playback unit in response to detecting a control pulse having one of a selected plurality of the response states, receiving each of the response input signals provided by the response input elements upon actuation thereof, comparing the response state of the detected control pulse and the response state of the received response input signal, and terminating production of the pause signal when the response state of the detected control pulse is equal to the response state of the received response input signal;
    a video control unit connected to the source record playback unit and to the video display unit, the video control unit comprising:
        an asyncronous interface circuit means connected to the source record playback unit, the asynchronous interface circuit means for receiving the video control portion of the composite source output signal, detecting the video display pulses entrained in the video control portion, providing an input data signal having input data pulses entrained therein corresponding to the detected video display pulses, and providing an input clock signal having an input clock pulse entrained therein in response to detecting a predetermined number of the video display pulses;
        a timer circuit means for providing an output clock signal having output clock pulses entrained therein at a predetermined output clock rate, providing an end-of-scan-line signal having end-of-scan-line pulses entrained therein at a predetermined end-of-scan-line rate, and providing an end-of-field signal having end-of-field pulses entrained therein at a predetermined end-of-field rate;
        a memory control circuit means connected to the asynchronous interface circuit means and to the timer circuit means, the memory control circuit means for receiving the input data signal, the input clock signal and the output clock signal, storing each input data pulse entrained in the received input data signal at a predetermined storage location in response to receiving each input clock pulse entrained in the input clock signal, and providing a video output signal having a video data pulse entrained therein corresponding to the input data pulse stored at a predetermined storage location in response to each output clock pulse entrained in the output clock signal;
        a video processing circuit means connected to the memory control circuit means, to the timer circuit means, and to the video display unit, the video processing circuit means for receiving the video output signals, the end-of-scan-line signal, and the end-of-field signal, producing a horizontal sync pulse in response to receiving each end-of-scan-line pulse entrained in the end-of-scan-line signal, producing a vertical synch pulse in response to receiving each end-of-field pulse entrained in the end-of-field signal, and adding the horizontal and vertical sync pulses to the received video output signal for application to the video display unit as the composite video signal; and,
    means connected to the source record playback unit and to the audio output unit for receiving the audio portion of the composite source output signal and applying the received audio portion to the audio output unit as the audio signal.

2. The audio-visual teaching machine of claim 1 wherein the memory control circuit means of the video control unit is further defined to include:
    an input address counter circuit means connected to the asynchronous interface circuit means, the input address counter circuit means for receiving the input clock signal, incrementing an input address count in response to receiving each input clock pulse entrained in the input clock signal, providing an input address signal corresponding to the input address count, and resetting the input address count to an initial input address value in response to receiving a predetermined number of the input clock pulses;

an output address counter circuit means connected to the timer circuit means, the output address counter circuit means for receiving the output clock signal, incrementing an output address count in response to receiving each output clock pulse entrained in the output clock signal, providing an output address signal corresponding to the output address count, and periodically resetting the output address count to an initial output address value in response to receiving a predetermined number of the output clock pulses;

an input/output control circuit means connected to the input address counter circuit means and to the output address counter circuit means, the input/output control circuit means for receiving the input address signal and the output address signal, comparing the received input address signal and the received output address signal, providing an I/O control signal in an input state when the received input address signal is equal to the received output address signal, and providing the I/O control signal in an output state when the received input address is not equal to the received output address signal; and, a memory circuit means connected to the asynchronous interface circuit means, to the output address counter circuit means and to the input/output control circuit means, the memory circuit means for receiving the input data signal, the output address signal and the I/O control signal, storing each input data pulse entrained in the received input data signal at a predetermined storage location corresponding to the received output address signal in response to simultaneously receiving the I/O control signal in the input state, and providing a video output signal having a video data pulse entrained therein corresponding to the input data pulse stored at the predetermined storage location corresponding to the received output address signal in response to simultaneously receiving the I/O control signal in the output state.

3. The audio-visual teaching machine of claim 2 wherein the source control unit means is further characterized as providing a frame control signal having a frame control pulse entrained therein when the response state of the received response input signal is equal to the response state of the detected control pulse, and wherein the input address counter circuit means of the video control unit is further characterized as being connected to the source control unit means, the input address counter circuit means receiving the frame control signal and resetting the input address count to the initial input address value in response to receiving the frame control pulse entrained in the frame control signal.

4. The audio-visual teaching machine of claim 3 wherein one of the response states is further characterized as a frame erase state, and wherein the source control unit means is further characterized as providing the frame control signal having the frame control pulse entrained therein in response to detecting a control pulse in the frame erase state entrained in the source control portion.

5. The audio-visual teaching machine of claim 4 wherein the video control unit is further defined to include:

a frame erase circuit means interposed between the source control unit and the input address counter circuit of the video control unit and connected to the memory circuit, the frame erase circuit means for receiving the frame control signal provided by the source control unit means, producing a clear signal having a clear pulse entrained therein for application to the input address counter circuit means in place of the frame control signal, producing an I/O control signal in the input state for application to the memory circuit means in place of the I/O control signal produced by the input/output control circuit means, and producing a blank data signal having a predetermined number of blank data pulses entrained therein corresponding to a predetermined type of input data pulse provided by the asyncronous interface circuit means for application to the memory circuit means in place of the input data signal provided by the asyncronous interface circuit means.

6. The audio-visual teaching machine of claim 2 wherein each of the predetermined number of input data pulses provided by the asynchronous interface circuit means comprises an input character code; wherein the output address counter circuit means is further characterized as incrementing a scan-line count in response to incrementing the output address count a predetermined number of times, for providing a scan-line signal corresponding to the scan-line count, and for periodically resetting the scan-line count to a predetermined scan-line starting value in response to incrementing the scan-line count a predetermined number of times; wherein the timer circuit means is further characterized as providing a bit clock signal having bit clock pulses entrained therein at a predetermined bit clock rate; and wherein the memory circuit means is further defined to include:

a character memory circuit means connected to the asynchronous interface circuit means, to the output address counter circuit means and to the input/output control circuit means, the character memory circuit means for receiving the input data signal, the output address signal and the I/O control signal, storing each input character code consisting of the predetermined number of input data pulses entrained in the received input data signal at a predetermined storage location corresponding to the received output address signal in response to simultaneously receiving the I/O control signal in the input state, and providing an output character signal having an output character code entrained therein corresponding to the input character code stored at the predetermined storage location corresponding to the received output address signal in response to simultaneously receiving the I/O control signal in the output state;

a character generator means connected to the character memory means and to the output address control circuit means, the character generator means for receiving the output character signal and the scan-line signal, generating a character bit pattern corresponding to the output character code entrained in the received output character signal, each character bit pattern being comprised of a predetermined number of scan-line bit patterns, and providing a bit pattern signal having bit pattern pulses entrained therein corresponding to the scan-line bit pattern of the generated character bit pattern corresponding to the received scan-line signal; and, a video shift register means connected to the character generator means, to the timer circuit means, and to the video processing circuit means, the video shift register means for receiving the bit pattern signal and the bit clock signal, and providing a consecutive one of the bit pattern pulses entrained in the received bit pattern signal for application to the video processing circuit means as the video output signal in response to each bit clock pulse entrained in the received bit clock signal.

7. The audio-visual teaching machine of claim 1 wherein the means for receiving the audio portion of the composite source output signal are further characterized as comprising a portion of the source control unit means.

8. The audio-visual teaching machine of claim 1 wherein the audio output unit and the video display unit are further characterized as comprising portions of a television receiver including an RF receiver portion, the audio-visual teaching machine further comprising:

an RF interface circuit means interposed between the video control unit means and the video display unit portion of the television receiver, and interposed between the source control unit means and the audio output unit portion of the televison receiver, the RF interface circuit means for receiving the composite video signal and the audio signal, and modulating the received composite video signal and the received audio signal onto an RF carrier having a predetermined frequency for application to the RF receiver portion of the television receiver.

* * * * *